US012782323B2

(12) United States Patent
Kim et al.

(10) Patent No.: US 12,782,323 B2
(45) Date of Patent: Nov. 3, 2026

(54) DIAGNOSIS METHOD AND SYSTEM BY ANALYZING SIGNAL BASED ON CNN

(71) Applicant: Industry Academic Cooperation Foundation of Yeungnam University, Gyeongsan-si (KR)

(72) Inventors: Byeong Il Kim, Daegu (KR); Dong Woo Hong, Daegu (KR)

(73) Assignee: INDUSTRY ACADEMIC COOPERATION FOUNDATION OF YEUNGNAM UNIVERSITY, Gyeongsan-si (KR)

( * ) Notice: Subject to any disclaimer, the term of this patent is extended or adjusted under 35 U.S.C. 154(b) by 567 days.

(21) Appl. No.: 18/226,853

(22) Filed: Jul. 27, 2023

(65) Prior Publication Data

US 2024/0302331 A1 Sep. 12, 2024

(30) Foreign Application Priority Data

Mar. 7, 2023 (KR) ........................ 10-2023-0029867

(51) Int. Cl.

*G01N 29/46* (2006.01)
*G01N 29/14* (2006.01)
*G01N 29/44* (2006.01)

(52) U.S. Cl.

CPC ............. *G01N 29/46* (2013.01); *G01N 29/14* (2013.01); *G01N 29/4481* (2013.01)

(58) Field of Classification Search

CPC .. G01M 13/045; G01M 13/028; G01H 1/003; G01H 17/00; G06F 2218/08;

(Continued)

(56) References Cited

U.S. PATENT DOCUMENTS

| | | | | |
|---|---|---|---|---|
| 5,638,305 | A * | 6/1997 | Kobayashi ....... | G10K 11/17815 702/56 |
| 2008/0033695 | A1* | 2/2008 | Sahara .................. | G01H 1/003 702/185 |
| 2022/0244682 | A1* | 8/2022 | Walczyk ............. | G05B 13/027 |

FOREIGN PATENT DOCUMENTS

| | | |
|---|---|---|
| KR | 102189269 B1 | 12/2020 |
| KR | 20210067108 A | 6/2021 |

(Continued)

OTHER PUBLICATIONS

Li, Shaobo, et al. "An ensemble deep convolutional neural network model with improved DS evidence fusion for bearing fault diagnosis." Sensors 17.8 (2017): 1729. (Year: 2017).*

(Continued)

*Primary Examiner* — Catherine T. Rastovski
*Assistant Examiner* — Carter W Ferrell
(74) *Attorney, Agent, or Firm* — DILWORTH IP, LLC

(57) ABSTRACT

A diagnosis system and a diagnosis method are presented, which utilize a CNN-based signal analysis, that are capable of diagnosing various mechanical equipment pieces by analyzing vibration or noise occurring in the various mechanical equipment pieces in industrial sites on the basis of a deep learning technique. The effect of efficiently performing signal analysis and signal-feature extraction can be achieved. The effect of extracting a feature of an automatically measured signal on the basis of a result obtained through a feature extraction process in a case where it is necessary to set up a database can be achieved.

7 Claims, 6 Drawing Sheets

(58) Field of Classification Search
CPC ............ G06F 2207/4824; G01N 29/14; G01N 29/46; G01N 29/4481; G01N 3/0464; F16C 2233/00
See application file for complete search history.

(56) References Cited

FOREIGN PATENT DOCUMENTS

| | | | | | |
|---|---|---|---|---|---|
| KR | 102335013 | B1 | * | 12/2021 | ............... G06N 3/08 |
| KR | 20220013134 | A | | 2/2022 | |
| KR | 10-2393095 | B1 | | 5/2022 | |

OTHER PUBLICATIONS

Qian, Weiwei, et al. "An intelligent fault diagnosis framework for raw vibration signals: Adaptive overlapping convolutional neural network." Measurement Science and Technology 29.9 (2018): 095009. (Year: 2018).*

Hong, Dongwoo; A 1D-Convolutional Neural Network-Based Signal Tracking Algorithm Emphasized on Signal Feature Extraction and System Fault Diagnosis; Graduate School of Yeungnam University; Feb. 2023.

* cited by examiner

DIAGNOSIS METHOD AND SYSTEM BY ANALYZING SIGNAL BASED ON CNN

CROSS REFERENCE TO RELATED APPLICATION

The present application claims priority to Korean Patent Application No. 10-2023-0029867 filed on Mar. 7, 2023, the entirety of which is incorporated by reference herein.

TECHNICAL FIELD

The present disclosure relates to a diagnosis system and, more particularly, to a diagnosis system and a diagnosis method, which utilize a CNN-based signal analysis, that are capable of diagnosing various mechanical equipment pieces by analyzing vibration or noise occurring in the various mechanical equipment pieces in industrial sites on the basis of a deep learning technique.

BACKGROUND

Diagnosis systems, which monitor and diagnose a state of a mechanical equipment piece that operates in industrial sites, such as construction sites and manufacturing factories, by measuring vibration or noise that occurs in the mechanical equipment piece, have been installed and operating in the industrial sites.

In order to analyze measured signals and frequencies thereof, these diagnosis systems extract features of the measured signals using signal modulation techniques, such as fast Fourier transform (FFT), short time Fourier transform (STFT), and auto regressive (AR) spectrum, and analysis techniques, such as principal component analysis (PCA), t-distributed stochastic neighbor embedding (T-SNE), and permutation entropy and complexity, and establishes and utilizes a database of the extracted features.

A problem occurring in the mechanical equipment piece is recognized using the database, which is established through the signal analysis, and a controller is then designed to perform control the mechanical equipment piece, ensuring its stable operation.

The database is established utilizing the signals measured by each mechanical equipment piece through these analysis techniques, and the controller is suitably designed in such a manner as to efficiently control vibration or noise.

However, in the related art, it takes much time to analyze a signal before designing a controller for a specific mechanical equipment piece. Signals, which occur in the mechanical equipment piece actually operating in the industrial sites, have a complex spectrum and thus are not easy to analyze exactly.

In addition, when the controller performs control, there may occur a situation where a state of a diagnosis-target mechanical equipment piece changes, for example, a situation where an external disturbance applies thereto or where a defect occurs in a mechanical component thereof. In this situation, when a responsiveness feature of the diagnosis-target mechanical equipment piece changes, in the related art, there occurs a limitation in that this change is difficult to deal with in real time.

That is, when a technique of diagnosing a mechanical equipment piece is employed in the related art, it is complex to analyze a signal occurring in the mechanical equipment piece that operates at operation and to establish a database. Furthermore, since the real-time state of a system is not taken into consideration, the performance of a controller installed in the mechanical equipment piece decreases when an external disturbance and a defect occur.

SUMMARY

An object of the present disclosure, which is contrived to find a solution to the above-mentioned problems, is to provide a diagnosis system and a diagnosis method that are capable of in real time measuring vibration or noise that occurs in various mechanical equipment pieces installed in industrial sites and of analyzing the vibration or the nose through a deep learning model. In the diagnosis system and the diagnosis method, a feature of the mechanical equipment piece can be extracted much more efficiently than a diagnosis system in the related art, and the use of information on a state diagnosis as feedback information can prevent a decrease in performance of a controller.

In order to achieve the above-mentioned object, according to an aspect of the present disclosure, there is provided a diagnosis method for use by a diagnosis system for diagnosing a state of a diagnosis-target apparatus by receiving and analyzing vibration or noise that is output from the diagnosis-target apparatus, the diagnosis method includes: receiving measurement signals from one or more sensors that measure the vibration or the noise; extracting a signal feature through a CNN algorithm made up of a plurality of convolution layers; and diagnosing a drive state of the diagnosis-target apparatus according to the signal feature and outputting diagnosis information of the drive state.

In the diagnosis method, the extracting of the signal feature through the CNN algorithm made up of the plurality of convolution layers may include: converting a signal computed by the plurality of convolution layers into a frequency-band signal by applying an FFT algorithm to the signal; computing an RMS value of the frequency-band signal and setting the computed RMS value as a criterion; extracting a plurality of peak values as a plurality of signal features according to the criterion and storing an index for a common signal feature, among the plurality of signal features; and extracting frequency and phase components, which correspond to the signal feature, from the measurement signal, using the index.

In the diagnosis method, the extracting of the signal feature through the CNN algorithm made up of the plurality of convolution layers may include: receiving the measurement signal in real time and filtering the received measurement signal to obtain a frequency-band signal that is necessary for analysis; receiving filtered signals sequentially and performing convolution on the received filtered signals; and determining the state of the diagnosis-target apparatus in response to an output signal that undergoes a convolution process.

The diagnosis method, after the extracting of the frequency and phase components, which correspond to the signal feature, from the measurement signal, using the index, may further include: inputting the extracted frequency and phase components as a signal for feedback on an LMS algorithm; and determining, using the extracted signal feature, whether or not an error occurs in the diagnosis-target apparatus.

The diagnosis method, after the diagnosing of the drive state of the diagnosis-target apparatus according to the signal feature and outputting the diagnosis information of the drive state, may further include: inputting the diagnosis information into a controller installed in the diagnosis-target apparatus; and compensating for a change in the state of the diagnosis-target apparatus in response to the diagnosis information.

In order to achieve the above-mentioned object, according to another aspect of the present disclosure, there is provided a diagnosis system for diagnosing a state of a diagnosis-target apparatus by analyzing vibration or noise that is output from the diagnosis-target apparatus, the system including: a diagnosis unit configured to receive measurement signals from one or more sensors that measure the vibration or the noise, to diagnose a drive state of the diagnosis-target apparatus according to the signal feature extracted by a CNN algorithm made up of a plurality of convolution layers, and to output diagnosis information of the drive state; an FFT unit configured to convert a signal computed by the plurality of convolution layers into a frequency-band signal by applying an FFT algorithm to the signal; an RMS unit configured to compute an RMS value of the frequency-band signal and to set the computed RMS value as a criterion; an index storage unit configured to extract a plurality of peak values as a plurality of signal features according to the criterion and to store an index for a common signal feature, among the plurality of signal features; and a frequency and phase extraction unit configured to extract frequency and phase components, which correspond to the signal feature, from the measurement signal, using the index.

In the diagnosis system, the diagnosis unit may include: a filter layer configured to receive the measurement signal in real time and to filter the received measurement signal to obtain a frequency-band signal that is necessary for analysis; a plurality of convolution layers configured to sequentially receive signals filtered by the filter layer and to perform convolution on the received filtered signals; and a diagnosis layer configured to determine the state of the diagnosis-target apparatus in response to an output signal that undergoes a convolution process.

In the diagnosis system, the frequency and phase extraction unit may input the extracted frequency and phase components as a signal for feedback on an LMS algorithm and may determine, using the extracted signal feature, whether or not an error occurs in the diagnosis-target apparatus.

In the diagnosis system, the diagnosis information may be input into a controller installed in the diagnosis-target apparatus, and the controller may compensate for a change in the state of the diagnosis-target apparatus in response to the diagnosis information.

According to embodiments of the present disclosure, the effect of performing signal analysis and signal-feature extraction more efficiently than a diagnosis system in the related art that operates in the industrial sites can be achieved. Furthermore, the effect of extracting a feature of an automatically measured signal on the basis of a result obtained through a feature extraction process in a case where it is necessary to set up a database can be achieved.

In addition, according to the embodiments of the present disclosure, a defect of the mechanical equipment piece that operates can be recognized in advance by utilizing the diagnosis information of the state of the mechanical equipment piece that is obtained by the diagnosis system. It is possible to control the mechanical equipment piece by driving the controller through diagnosis information feedback that uses the measurement signal. Thus, the effect of solving a problem that occurs when it takes much time to take subsequent action against a defect can be achieved.

DETAILED DESCRIPTION

Figure 1:
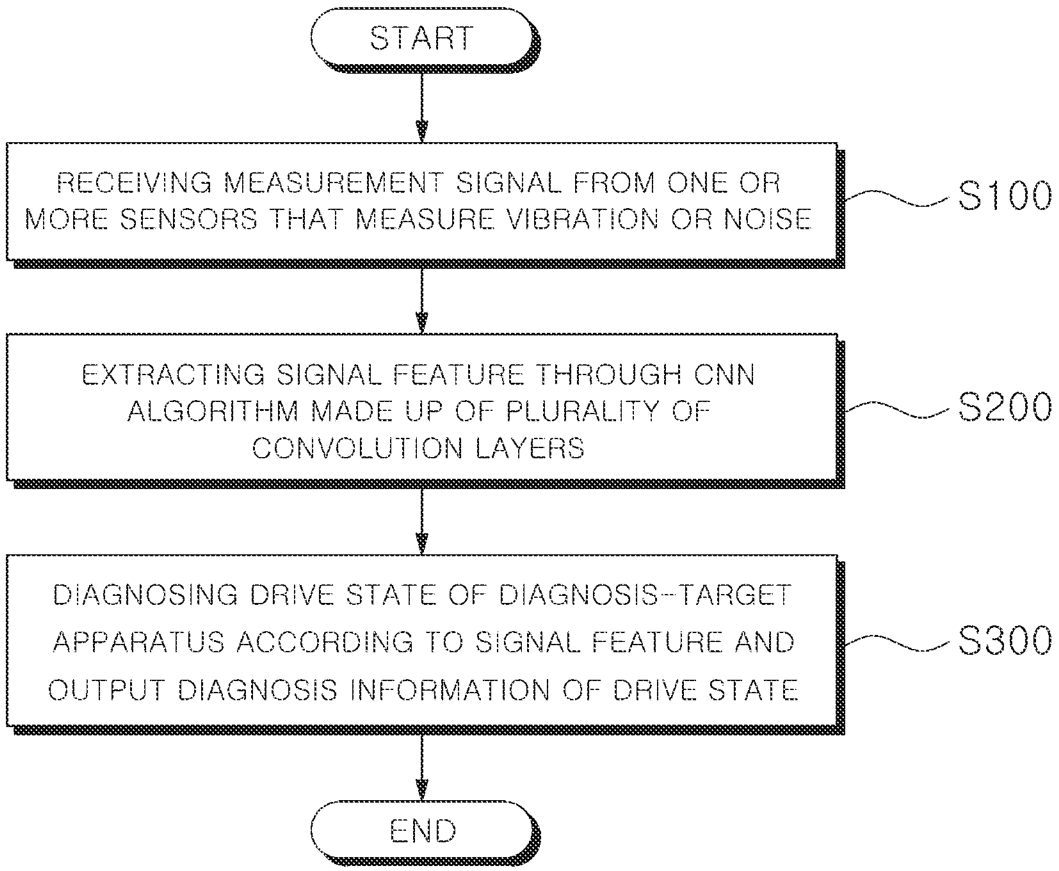
FIG. 1 is a flowchart illustrating a method of diagnosis through a CNN-based signal analysis according to a first embodiment of the present disclosure.

Embodiments of the present disclosure will be described in detail below with reference to the accompanying drawings.

Technical terms used in the present specification are only for describing specific embodiments of the present disclosure. It is noted that the use of the terminal terms should not be intended to impose any limitation on the present disclosure. In addition, unless otherwise particularly defined, the technical terms used in the present specification should be construed as having the meaning that is understandable to a person of ordinary skill in the art to which the present disclosure pertains. Furthermore, the technical terms should not be construed in an excessively broad or narrow sense. In addition, when the technical terms used in the present specification do not exactly convey the specificity of the inventor's idea of the present disclosure, they should be replaced with other technical terms properly understandable to a person of ordinary skill. In addition, general terms used in the present specification should be construed as defined in a dictionary or within the context of the present specification and should not be construed in an excessively narrow sense.

In addition, throughout the present specification, a noun in singular form has the same meaning as when used in plural form, unless it has a different meaning within the context of the present specification. The expression "is configured with," "include," or the like, which is used in the present specification, should not be construed as being used to necessarily include all constituent elements or all steps that are described in the present specification. Instead, the expression should be construed in such a manner that, among all the constituent elements or among all the steps, one or several constituent elements or one or several steps, respectively, may not be included, or that one or several other constituent elements, or one or several other steps may be further included.

Through the present specification, the terms "first," "second," and so on, which are used in the present specification, may be used to describe various constituent elements, but do not impose any limitation on various constituent elements. These terms are used only to distinguish one constituent element from another. For example, a first constituent element may be named a second constituent element without departing from the scope of the present disclosure. Likewise, the second constituent element may also be named the first constituent element.

Preferred embodiments of the present invention are described with reference to the accompanying drawings. The same constituent elements are given the same reference numeral, and descriptions thereof are not repeated.

In addition, a detailed description of a well-known technology that is associated with the present disclosure will be omitted when determined as making the nature and gist of the present disclosure obfuscated. In addition, the accompanying drawings serve only to help get an easy understanding of the idea of the present disclosure. It is noted that the inventor's idea of the present disclosure should not be construed as being limited by the accompanying drawings.

A "diagnosis system" and a "system" may be interchangeably used hereinafter to refer to a "system for diagnosis through a CNN-based signal analysis" according to the present disclosure.

A method of diagnosis through a CNN-based signal analysis according to a first embodiment of the present disclosure, and a system 100 for diagnosis through a CNN-based signal analysis according to a second embodiment of the present disclosure will be described in detail below with reference to the drawings.

FIG. 1 is a flowchart illustrating the method of diagnosis through a CNN-based signal analysis according to the first embodiment of the present disclosure. Unless otherwise specified, a stepwise executing entity described below refers to the diagnosis system 100 according to the present disclosure and constituent elements thereof.

With reference to FIG. 1, the method of diagnosis through a CNN-based signal analysis according to the first embodiment of the present disclosure refers to a diagnosis method for use by a diagnosis system 100 for diagnosing a state of a diagnosis-target apparatus by receiving and analyzing vibration or noise that is output from the diagnosis-target apparatus. The method may include Step S100 of receiving one or more measurement signals from one or more sensors that measure vibration or noise, Step S200 of extracting a signal feature through a CNN algorithm made up of a plurality of convolution layers, and Step S300 of performing system diagnosis according to the signal feature and outputting diagnosis information.

In Step S100, one or more sensors are installed inside a diagnosis-target mechanical equipment piece of which a current drive state needs to be diagnosed, vibration and noise are measured, and measurement signals of the sensors are received.

Various drive members, such as a bearing and a linear motion guide, may be mounted in the diagnosis-target mechanical equipment piece. The sensors are correspondingly installed adjacent to these drive members. Consequently, the vibration and the noise are measured in real time and are analyzed through the diagnosis system 100.

As the above-mentioned sensor, an "accelerometer" or the like may be used.

Next, in Step S200, the measurement signals that are input through the CNN algorithm that applies to the diagnosis system 100 are analyzed. The signal resulting from the measurement undergoes a filtering process for real-time signal processing. Then, the filtered signal is sequentially input into a plurality of convolution layers that are based on a 1D CNN model. The signal that is output from the plurality of convolution layers is converted into a frequency domain, and a root mean square (RMS) value of the signal is computed. Accordingly, frequency and phase components that correspond to the signal feature can be acquired.

Particularly, with the 1D CNN model, variously sized neural networks can be established in such a manner that they are advantageous in extracting respective features of the vibration and the noise by adjusting a filter size, the number of filters, the number of maxpooling hidden layer nodes, and the like. The suitably improved 1D CNN model can be applied to a diagnosis unit according to the present disclosure. Step S200 will be described in more detail below.

In Step S300, the current drive state of the mechanical equipment piece that is the diagnosis-target apparatus is diagnosed using one or more signal features that are extracted through the diagnosis unit that is based on the 1D CNN model, and diagnosis information of the current drive state is output.

As a result, through the use of the diagnosis information, a mechanical equipment operator can easily determine whether or not an error occurs in the diagnosis-target mechanical equipment piece, the current drive state of the diagnosis-target mechanical equipment piece, and the like.

Step S200 of the method of diagnosis through a CNN-based signal analysis according to the first embodiment of the present disclosure will be described in detail below with reference to the drawings.

Figure 2:
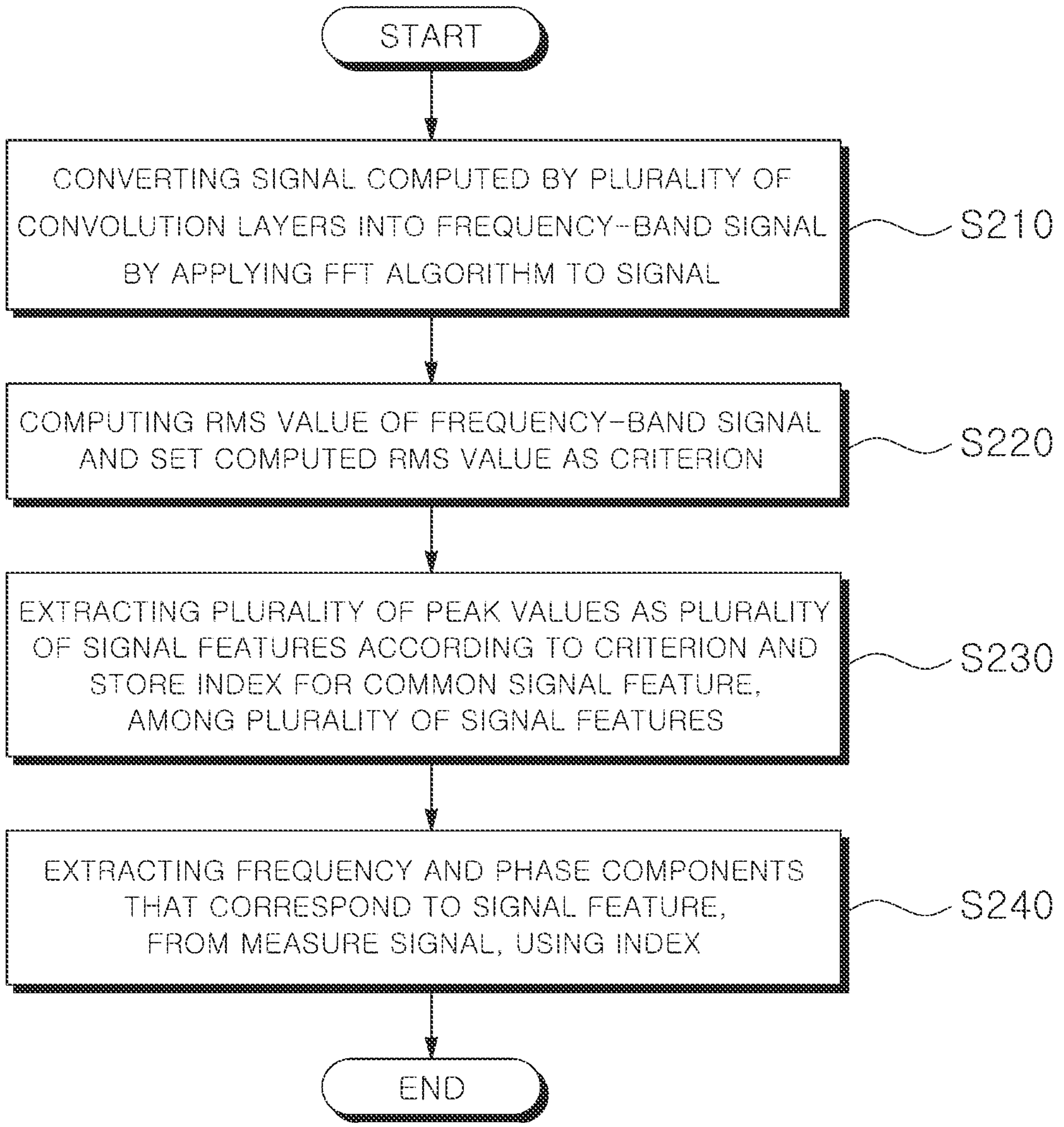
FIG. 2 is a flowchart specifically illustrating a step of extracting a signal feature through a CNN algorithm, of the method in FIG. 1.

FIG. 2 is a flowchart specifically illustrating Step S200 of the method of diagnosis through a CNN-based signal analysis in FIG. 1.

With reference to FIG. 2, Step S200 (in FIG. 1) of the method of diagnosis through a CNN-based signal analysis according to the first embodiment of the present disclosure may include Step S210 of converting a signal computed by a plurality of convolution layers into a frequency-band signal by applying a fast Fourier transform (FFT) algorithm to the signal, Step S220 of computing an RMS value of the frequency-band signal and setting the computed RMS value as a criterion, Step S230 of extracting a plurality of peak values as a plurality of signal features according to the criterion and storing an index for a common signal feature, among the plurality of signals, and Step S240 of extracting, from the measurement signals, frequency and phase components that correspond to the signal feature, using the index.

In Step S210, the output signal of each convolution layer is converted into a frequency signal through the well-known Fast Fourier Transform (FFT) algorithm because frequency information is required to extract the signal feature from a filtered input signal.

Next, in Step S220, the RMS value of the frequency signal acquired in Step S210 is computed, and a criterion for extracting an amplitude that is determined as representing the signal feature in each frequency band is set.

Values of one or more peaks can be present in the frequency signal. Therefore, the RMS value of the frequency signal is computed, and the computed value of the RMS is set as the criterion. Accordingly, a range of frequencies having an amplitude greater than the criterion can be extracted as the signal reference. In addition, in Step S220, the range of frequencies for extracting the peak can be set.

Next, in Step S230, one or more ranges of frequencies that have a peak value higher than the criterion that is set in Step S220 can be extracted, and indexes for the plurality of peak values that are extracted on a per-frequency range basis can be stored.

Then, in Step S240, an index that repeatedly becomes common is selected from among the plurality of indexes that are extracted for each convolution layer, and the selected index is extracted as the signal feature. During the ongoing execution of a convolution procedure, the peak value that is commonly present can be determined as the signal feature of the input signal. Therefore, the frequency and phase components of the input signal are extracted as the signal feature by extracting the same index and substituting the extracted same index into the input signal. The signal feature, serving as the diagnosis information, can be used in determining a current drive state of the diagnosis-target apparatus and whether an error occurs in the diagnosis-target apparatus.

In addition, although not illustrated, Step S200, after Step S240, may further include a step of inputting the extracted frequency and phase components as a signal for feedback on a least mean square (LMS) algorithm and a step of determining whether or not an error occurs in the extracted signal feature.

With the method of diagnosis through a CNN-based signal analysis according to the first embodiment of the present disclosure, which includes the steps described above, state information of the mechanical equipment piece that operates can be acquired in real time. Consequently, the mechanical equipment piece can be directly controlled.

Figure 3:
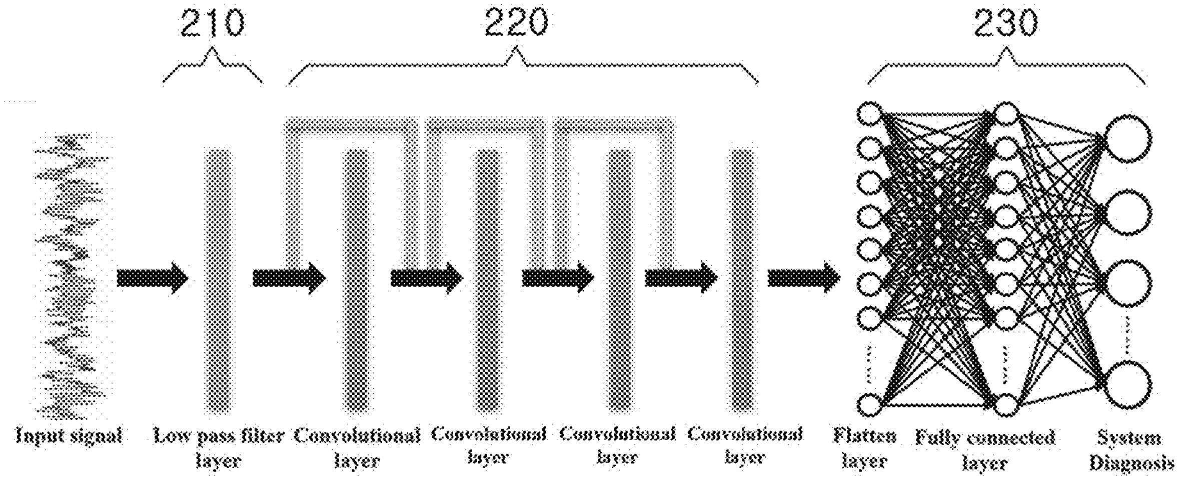
FIG. 3 is a diagram illustrating a structure of a CNN algorithm that applies to the method of diagnosis through a CNN-based signal analysis according to the first embodiment.

FIG. 3 is a diagram illustrating a structure of the CNN algorithm that applies to the method of diagnosis through a CNN-based signal analysis according to the first embodiment.

With reference to FIG. 3, the CNN algorithm that applies to the method of diagnosis through a CNN-based signal analysis according to the first embodiment of the present disclosure may be broadly configured with a filter layer 210, a plurality of convolution layers 220, and a diagnosis layer 230.

Specifically, according to the present disclosure, the measurement signals that result from measuring the vibration and noise of the mechanical equipment piece are input, as the input signals, into the diagnosis system 100. The measurement signals are filtered through a low pass filter that filters out a signal in a high frequency band. As a result, only a frequency-band signal that is necessary for analysis is input into the convolution layer 220.

The plurality of convolution layers 220 may be provided. An output signal of one layer sequentially becomes an input signal of the immediately following layer. The output signal of each layer is converted through an FFT unit and an RMS unit. Among the plurality of peak values extracted through the frequency information, the frequency and phase components that are repeatedly present are extracted as the signal feature.

The diagnosis layer 230 may be configured with "flatten layer," "fully connected layer," and the like of the 1D CNN model. The diagnosis information of the current drive state of the mechanical equipment piece can be generated and output on the basis of the extracted signal feature. The diagnosis information can be used to check whether or not an error occurs in the mechanical equipment piece, to prevent a decrease in performance of a controller, and the like.

Figure 4:
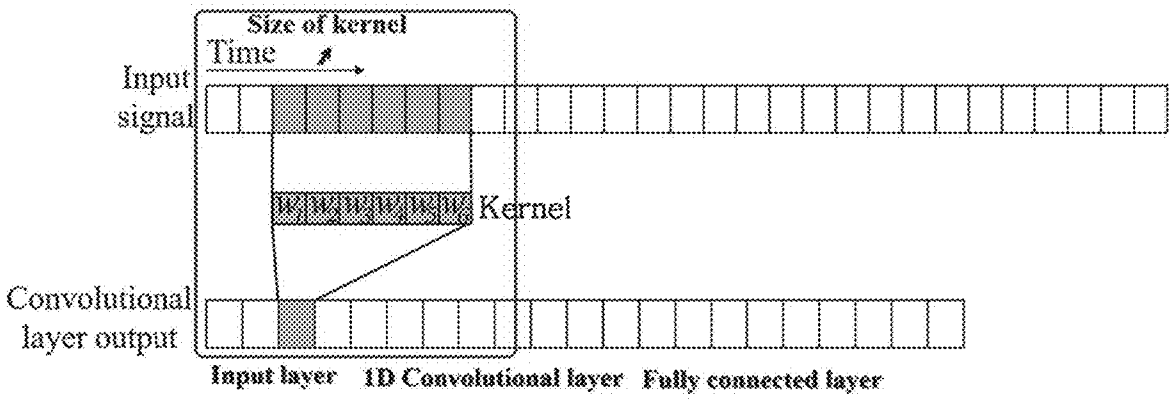
FIG. 4 is a diagram illustrating an exemplary structure for training through the use of a data set the CNN algorithm that is used in the method of diagnosis through a CNN-based signal analysis according to the first embodiment of the present disclosure.

FIG. 4 is a diagram illustrating an exemplary structure for training through the use of a data set the CNN algorithm that is used in the method of diagnosis through a CNN-based signal analysis according to the first embodiment of the present disclosure.

With reference to FIG. 4, the 1D CNN model that applies to the method of diagnosis through a CNN-based signal analysis according to the first embodiment of present disclosure can be used for analysis. To this end, the 1D CNN model can be caused to learn the vibration and the noise of the mechanical equipment piece using the well-known data set. The '1D' in the 1D CNN model here indicates that a kernel for convolution and a sequence of data that are input are one-dimensional. The 1D CNN model has the feature of being suitable for analyzing signals, such as vibration and noise, that are input in real time.

The input signals for training the ID CNN model are time-series data. The input signals can be sequentially input as convolution data, following the structure illustrated in FIG. 4, and can be learned.

Figure 5:
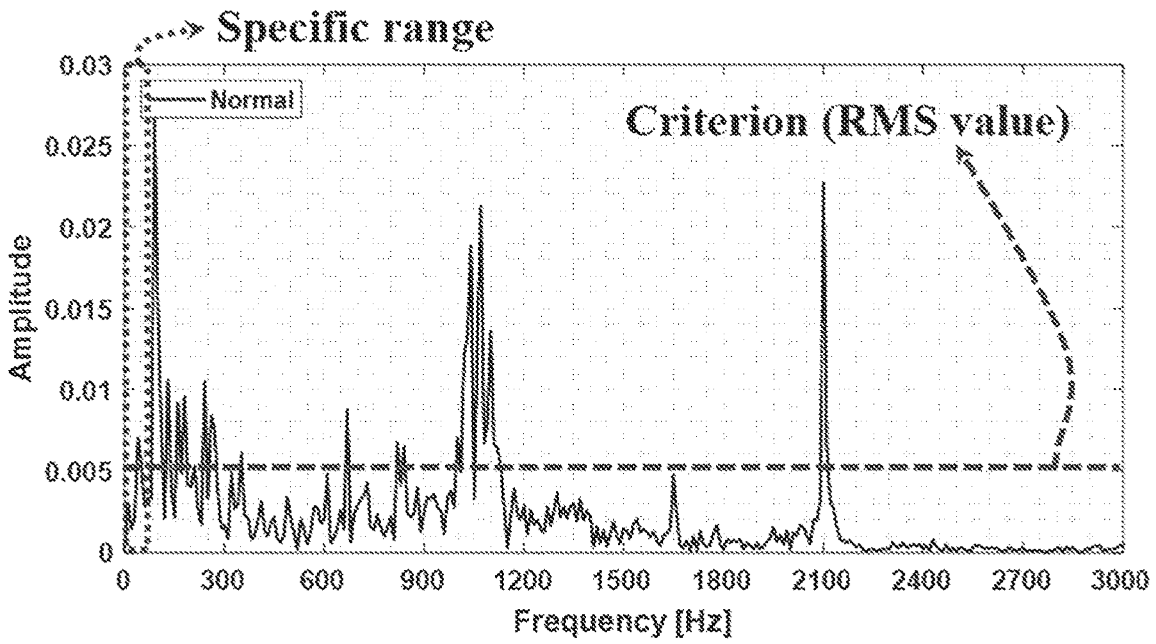
FIG. 5 is a graph of amplitude versus frequency on the basis of a signal waveform, which is referred to for description of a process of extracting a signal feature in the method of diagnosis through a CNN-based signal analysis according to the first embodiment of the present disclosure.

FIG. 5 is a graph of amplitude versus frequency on the basis of a signal waveform, which is referred to for description of a process of extracting a signal feature in the method of diagnosis through a CNN-based signal analysis according to the first embodiment of the present disclosure.

With reference to FIG. 5, the method of diagnosis through a CNN-based signal analysis according to the first embodiment of the present disclosure has the feature of extracting through the use of the frequency information the signal features of the signals that are output during a convolution process in compliance with the CNN algorithm. To this end, the output signal that is output from each convolution layer can be converted into a frequency signal in a frequency band of 0 Hz to 3000 Hz through the FFT algorithm. Then, the RMS value of the frequency signal can be computed, and the computed RMS value can be set as the criterion. A frequency having an amplitude higher than the criterion can be selected as a peak.

FIG. 5 illustrates that the criterion is set to '0.0005'.

Each peak value can be set on a per-frequency band basis by setting a specific frequency range for extracting the signal feature. As an example, when the frequency range is set to 50 Hz, a frequency value that exceeds the criterion can be extracted at one peak point, with a frequency interval of 50 Hz.

In this manner, one or more peaks can be selected for each convolution layer, and subsequently, the signal feature can be extracted by setting the index.

Figure 6:
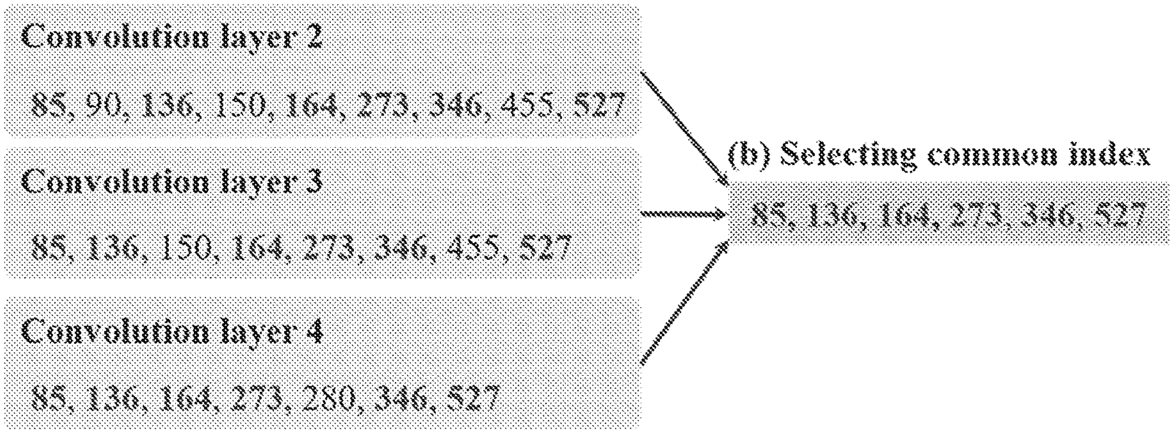
FIG. 6 is a diagram illustrating the process of extracting the signal feature in each convolution layer and a process of setting an index in the method of diagnosis through a CNN-based signal analysis according to the first embodiment of the present disclosure.
Figure 7:
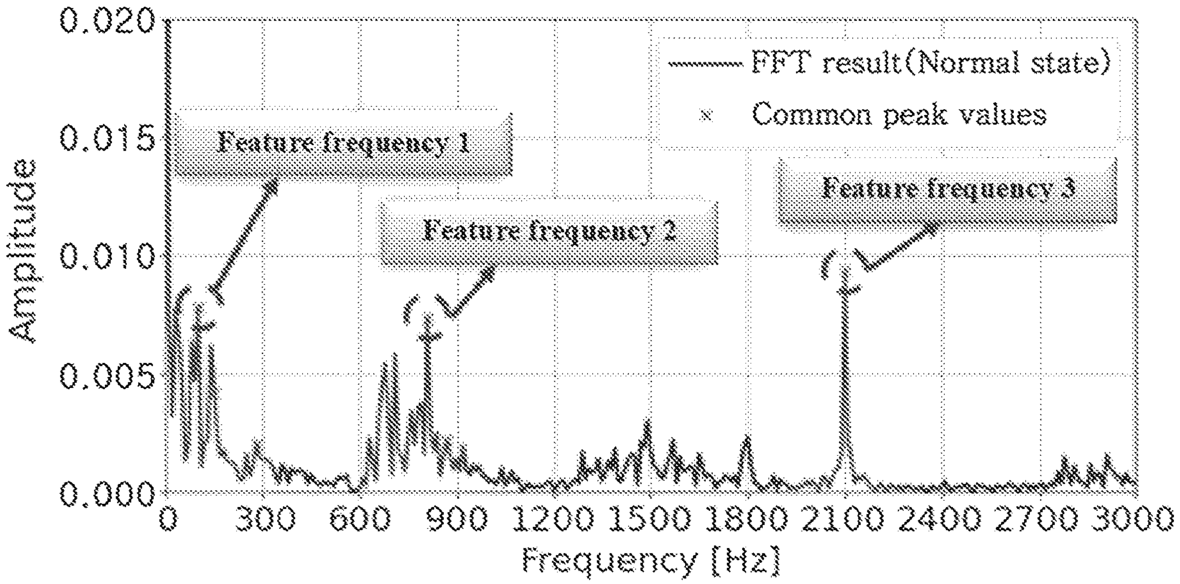
FIG. 7 is a graph of amplitude versus frequency on the basis of the signal waveform, which is referred to for description of a process of extracting frequency and phase components of an input signal in the method of diagnosis through a CNN-based signal analysis according to the first embodiment of the present disclosure.

FIG. 6 is a diagram illustrating the process of extracting the signal feature in each convolution layer and a process of setting the index in the method of diagnosis through a CNN-based signal analysis according to the first embodiment of the present disclosure. FIG. 7 is a graph of amplitude versus frequency on the basis of the signal waveform, which is referred to for description of a process of extracting the frequency and phase components of the input signal in the method of diagnosis through a CNN-based signal analysis according to the first embodiment of the present disclosure.

With reference to FIGS. 6 and 7, as described above, the index can be set for one or more peak that, in each convolution process, are extracted from the frequency signal obtained by performing FFT conversion and RMS conversion on the output signal that is output from each convolution layer. Then, a group of candidates for the signal feature can be selected by selecting a common index from among the indexes.

As an example, as illustrated in FIG. 6, when it is assumed that indexes for a second convolution layer are '85', '90', '136', '150', '164', '273', '346', '455', and '527', that indexes for a third convolution layer are '85', '136', '150', '164', '273', '346', '455', and '527', and that indexes for a fourth convolution layer are '85', '136', '164', '273', '280', '346', '527', common indexes that are selected are '85', '136', '164', '273', '346', and '527'.

Then, as illustrated in FIG. 7, the selected indexes '85', '136', and so forth up to '527' are substituted into the measurement signals, and one or more feature frequencies are extracted as the signal features from the resulting measurement signals.

A structure of a system 100 for realizing the method of diagnosis through a CNN-based signal analysis according to the first embodiment of the present disclosure.

Figure 8:
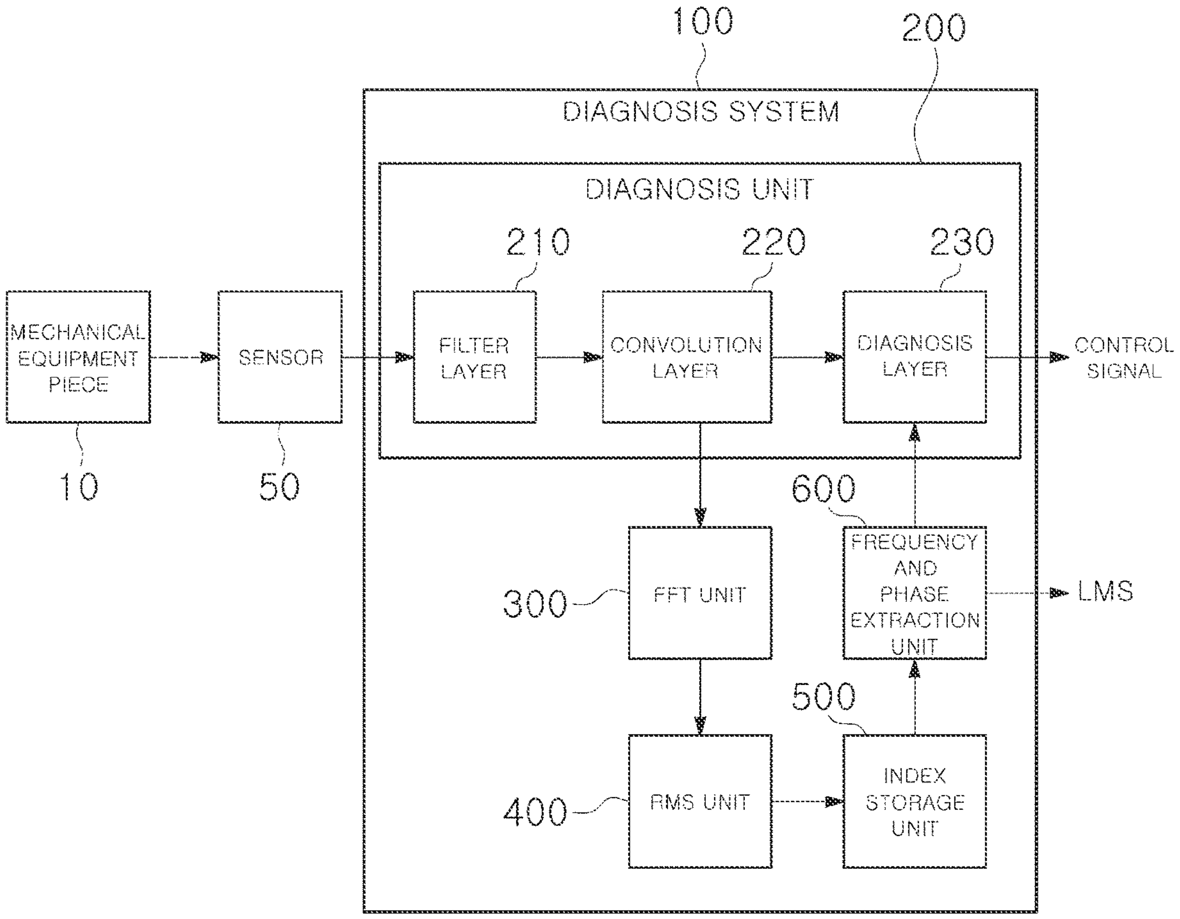
FIG. 8 is a diagram illustrating a system for diagnosis through a CNN-based signal analysis according to a second embodiment of the present disclosure.

FIG. 8 is a diagram illustrating the system 100 for diagnosis through a CNN-based signal analysis according to the second embodiment of the present disclosure. Constituent elements of the system 100 according to the present disclosure described below may be implemented in the form of a computer program executable by a well-known microprocessor and can be stored on a readable and writable recording medium.

With reference to FIG. 8, the system 100 for diagnosis through a CNN-based signal analysis according to the second embodiment of the present disclosure is a diagnosis system 100 for diagnosing a state of a diagnosis-target apparatus by analyzing vibration or noise that is output from the diagnosis-target apparatus. The system 100 may include a diagnosis unit 200, an FFT unit 300, an RMS unit 400, an index storage unit 500, and a frequency and phase extraction unit 600. The diagnosis unit 200 receives measurement signals from one or more sensors that measure vibration or noise, performs system diagnosis according to a signal feature extracted by a CCN algorithm configured with a plurality of convolution layers, and outputs diagnosis information. The FFT unit 300 converts a signal computed by the plurality of convolution layers into a frequency-band signal by applying an FFT algorithm to the signal. The RMS unit 400 computes an RMS value of the frequency-band signal and sets the computed RMS value as a criterion. The index storage unit 500 extracts a plurality of peak values as a plurality of signal features according to the criterion and stores an index for a common signal feature, among the plurality of signal features. The frequency and phase extraction unit 600 extracts, from the measurement signals, frequency and phase components that correspond to the signal feature, using the index.

The diagnosis unit 200 may receive in real time the measurement signals that result from measuring the vibration and noise of the mechanical equipment piece. Then, the diagnosis unit 200 may analyze the received measurement signals on the basis of the CNN algorithm and may generate the diagnosis information that reflects the current state of the mechanical equipment piece. In addition, in order to stably drive the mechanic equipment piece, the diagnosis unit 200 may generate a control signal in response to the diagnosis information and may output the generated control signal to the controller mounted in the mechanical equipment piece. Thus, the controller may control the driving of the mechanic equipment piece.

Consequently, the controller in the mechanical equipment piece may compensate for a change in the state of the mechanical equipment piece that is the diagnosis-target apparatus, in response to the diagnosis information.

Particularly, the diagnosis unit 200 may include a plurality of neural network layers based on the 1D CNN model for realizing the function described above. The neural network layers may be categorized into a filter layer 210, a convolution layer 220, and a diagnosis layer 230.

The filter layer 210 may receive the measurement signals in real time and may filter the measure signals to obtain the frequency-band signal that is necessary for analysis. A low pass filter may be used as the filter layer 210.

The convolution layer 220 may sequentially receive the signals filtered by the filter layer 210 and may perform convolution on the received filtered signals. The convolution layer 220 may be configured based on the 1D CNN algorithm and may be configured with a plurality of convolution layers that perform learning using a related data set. The convolution layer 220 may extract one or more signal features by analyzing the measurement signals that are input in a time-series manner.

The diagnosis layer 230 may determine the state of the diagnosis-target apparatus in response to the signal that undergoes the convolution process and may output the diagnosis information of the state of the diagnosis-target apparatus. The convolution layer 220 may output a multiplicity of signal features of the input signal. The diagnosis layer 230 may generate and output information on the current state of the mechanical equipment piece on the basis of the multiplicity of signal features.

In addition, in a case where an external disturbance applies to the diagnosis-target apparatus, or where the state of the diagnosis-target apparatus changes due to fault of mechanical components while the diagnosis-target apparatus operates, the diagnosis information acquired through the diagnosis layer 230 is used to maintain performance of the controller in the mechanical equipment piece that is the diagnosis-target apparatus.

The diagnosis system 100 according to the present disclosure may further include the constituent elements for extracting the signal feature of the signal that is output from each of the plurality of convolution layers 220 described above.

Specifically, the FFT unit 300 may provide the frequency information on the output signal by applying the fast Fourier transform (FFT) algorithm to each output signal computed by the plurality of convolution layers and may convert the output signal into the frequency-band signal.

The RMS unit 400 may set the criterion for extracting the signal feature by computing the RMS value of the frequency-band signal that is output from the FFT unit 300.

The index storage unit 500 may extract the signal feature by identifying a frequency having a peak higher than the criterion that is set by the RMS unit 400 and may store the index for the extracted signal feature. The index storage unit 500 performs a function of storing only common signal features, among the extracted signal features.

The frequency and phase extraction unit 600 may extract the frequency and phase components that correspond to the signal feature, by substituting the stored index into the input signal. In addition, the frequency and phase extraction unit 600 may determine whether or not an error occurs in the diagnosis-target apparatus, according to the signal feature extracted through the least mean square (LMS) algorithm. That is, the frequency and phase extraction unit 600 may track a signal representing an abnormal state, according to the input signal, using the extracted signal feature as the signal for the feedback on the LMS algorithm.

The constituent elements according to the embodiments of the present disclosure, which are in detail described above, should be construed as preferred implementation examples rather than restricting the scope of the present disclosure. Accordingly, the scope of the present disclosure should be defined by the following claims and their equivalents, not by the embodiments described above.

What is claimed is:

1. A diagnosis method for use by a diagnosis system for diagnosing a state of a diagnosis-target apparatus by receiving and analyzing vibration or noise that is output from the diagnosis-target apparatus, the diagnosis method comprising:

- receiving measurement signals from one or more sensors that measure the vibration or the noise;
- extracting a signal feature through a convolutional neural network (CNN) algorithm made up of a plurality of convolution layers; and
- diagnosing a drive state of the diagnosis-target apparatus according to the signal feature and outputting diagnosis information of the drive state;
- wherein the extracting of the signal feature through the CNN algorithm made up of the plurality of convolution layers comprises:
  - converting by a fast Fourier transform (FFT) unit, a signal computed by the plurality of convolution layers into a frequency-band signal by applying an FFT algorithm to the signal;
  - computing by a root mean square (RMS) unit, an RMS value of the frequency-band signal and setting the computed RMS value as a criterion;
  - extracting, by an index storage unit, a plurality of peak values as a plurality of signal features according to the criterion, selecting, from among a plurality of indexes extracted for each convolution layer, an index that repeatedly becomes common among the plurality of indexes, and storing the selected index as an index for a common signal feature; and
  - extracting, by a frequency and phase extraction unit, frequency and phase components corresponding to the common signal feature from the measurement signal using the selected index; and
- compensating for a change in the drive state of the diagnosis-target apparatus in response to the diagnosis information.

2. The diagnosis method of claim 1, wherein the extracting of the signal feature through the CNN algorithm made up of the plurality of convolution layers comprises:

- receiving a measurement signal in real time and filtering the received measurement signal to obtain a frequency-band signal that is necessary for analysis;
- receiving filtered signals sequentially and performing convolution on the received filtered signals; and
- determining the drive state of the diagnosis-target apparatus in response to an output signal that undergoes a convolution process.

3. The diagnosis method of claim 1, after the extracting of the frequency and phase components, which correspond to the common signal feature, from the measurement signal, using the index, further comprising:

- inputting the extracted frequency and phase components as a signal for feedback on a least mean square (LMS) algorithm; and
- determining, using the extracted signal feature, whether or not an error occurs in the diagnosis-target apparatus.

4. The diagnosis method of claim 1, further comprising:

- inputting the diagnosis information into a controller installed in the diagnosis-target apparatus.

5. A diagnosis system for diagnosing a state of a diagnosis-target apparatus by analyzing vibration or noise that is output from the diagnosis-target apparatus, the system comprising:

- a diagnosis unit configured to receive measurement signals from one or more sensors that measure the vibration or the noise, to diagnose a drive state of the diagnosis-target apparatus according to a signal feature extracted by a convolutional neural network (CNN) algorithm made up of a plurality of convolution layers, and to output diagnosis information of the drive state;
- a fast Fourier transform (FFT) unit configured to convert a signal computed by the plurality of convolution layers into a frequency-band signal by applying an FFT algorithm to the signal;
- a root mean square (RMS) unit configured to compute an RMS value of the frequency-band signal and to set the computed RMS value as a criterion;
- an index storage unit configured to extract a plurality of peak values as a plurality of signal features according to the criterion, to select, from among a plurality of indexes extracted for each convolution layer, an index that repeatedly becomes common among the plurality of indexes, and to store the selected index as an index for a common signal feature;
- a frequency and phase extraction unit configured to extract frequency and phase components, corresponding to the common signal feature, from the measurement signal, using the selected index; and
- a controller installed in the diagnosis-target apparatus and configured to receive the diagnosis information of the drive state and to compensate for a change in the drive state of the diagnosis-target apparatus in response to the diagnosis information.

6. The diagnosis system of claim 5, wherein the diagnosis unit comprises:

- a filter layer configured to receive a measurement signal in real time and to filter the received measurement signal to obtain a frequency-band signal that is necessary for analysis;
- a plurality of convolution layers configured to sequentially receive signals filtered by the filter layer and to perform convolution on the received filtered signals; and
- a diagnosis layer configured to determine the drive state of the diagnosis-target apparatus in response to an output signal that undergoes a convolution process.

7. The diagnosis system of claim 6, wherein the frequency and phase extraction unit inputs the extracted frequency and phase components as a signal for feedback on a least mean square (LMS) algorithm and determines, using the extracted signal feature, whether or not an error occurs in the diagnosis-target apparatus.

* * * * *